United States Patent Office 3,285,981
Patented Nov. 15, 1966

3,285,981
PRODUCTION OF ALPHA, OMEGA-SUBSTITUTED ALKANES
Alexander F. MacLean, Corpus Christi, and George M. Burlingame, Houston, Tex., assignors to Celanese Corporation of America, New York, N.Y., a corporation of Delaware
No Drawing. Filed Oct. 14, 1963, Ser. No. 316,151
7 Claims. (Cl. 260—659)

This invention relates broadly to a method of producing substituted alkanes and, more particularly, alpha, omega-disubstituted alkanes. Still more particularly the invention is concerned with the preparation of alpha, omega-dichloro-, dibromo-, diiodo- or dicyanoalkanes by reacting together (1) an olefin, e.g., ethylene, (2) an ion selected from the group consisting of chlorine, bromine, iodine and cyanide ions, and (3) an inorganic symmetrical per compound, e.g., inorganic persulfate, perphosphate, percarbonate, etc.

No pertinent prior art is known. The addition of halogens to olefins is reviewed in Walling's "Free Radicals in Solution," 298ff., published in 1957 by John Wiley and Sons, Inc., New York, N.Y.

The ionic reaction between a halogen, e.g., chlorine and ethylene, may be illustrated by the following equations:

(I) $\quad Cl_2 \longrightarrow Cl^+ + Cl^-$ (II) $\quad Cl^+ + CH_2=CH_2 \longrightarrow Cl\cdot CH_2\cdot CH_2^+ \xrightarrow{+Cl^-}$
$Cl\cdot CH_2\cdot CH_2\cdot Cl \xrightarrow{OH^-} Cl\cdot CH_2\cdot CH_2\cdot OH$ In marked contrast, the reaction of the present invention, which is a free radical reaction, yields homologues of 1,2-dichloroethane and analogues of said homologues and specifically those containing an even number of carbon atoms. Little, if any, ethylene chlorohydrin is made.

The present invention is based on the discovery that alpha, omega-disubstituted alkanes of the kind broadly described in the first paragraph of this specification, more particularly when reacting ethylene, to those containing at least four carbon atoms, e.g., 1,4-dichlorobutane, 1,6-dibromohexane, 1,8-dicyanooctane, etc., can be obtained as briefly described therein and more fully hereafter. In practicing the invention any source of chlorine, bromine, iodine and cyanide ions may be employed. Preferably the source is a water-soluble material. A convenient and economical source is a compound that is at least partly water-soluble and is represented by the general formula M—X where M represents a monovalent metal and X represents chlorine, bromine, iodine or cyanide. Advantageously M represents an alkali metal (sodium, potassium, lithium, cesium, and rubidium). Illustrative examples of other sources of these ions that may be employed are the dihalides of calcium, barium and magnesium, and the trihalides of aluminum, antimony and cerium.

The per compound reactants preferably are water-soluble persulfates including the water-soluble inorganic persulfates, e.g., the alkali-metal persulfates such, for instance, as sodium, potassium and lithium persulfates; and, also, ammonium persulfate. Illustrative examples of other persulfates that may be employed in this reaction are soluble persulfates such as the persulfates of calcium, strontium, barium and magnesium. Generally speaking, it is usually desirable to select the persulfate from among those that will not complicate the reaction. Among those that, for one reason or another, may complicate or tend to complicate the reaction so that optimum yields of desired product are difficult to obtain may be mentioned the persulfates of nickel, copper, cobalt and manganese.

Taking sodium chloride as illustrative of the source of the substitution ion, potassium persulfate as illustrative of the per compound employed, and ethylene as illustrative of olefins, the reaction that takes place may be illustrated by the following equation:

(III) $\quad 2NaCl + K_2S_2O_8 + nCH_2=CH_2 \rightarrow$
$Cl(CH_2-CH_2)_nCl + Na_2SO_4 + K_2SO_4$ In this reaction the chlorine ion is oxidized by the persulfate to yield a chlorine atom which then reacts with the ethylene as indicated by the following equations:

(IV) $\quad 2Cl^- + S_2O_8^= = 2SO_4^= + 2Cl\cdot$
(V) $\quad Cl\cdot + nCH_2=CH_2Cl(CH_2-CH_2)_n$
(VI) $\quad Cl(CH_2-CH_2)_n\cdot \rightarrow Cl(CH_2-CH_2)_nCl$ This was quite surprising and unobvious, since it was not expected and could not have been predicted that chlorine could be released at such a rate and concentration as to cause both the initiation and termination, concurrently, of the chain polymerization of ethylene.

The reaction is preferably carried out in the liquid phase, more particularly in an aqueous reaction medium, e.g., water alone, or water plus another additive, e.g., an acid or an alcohol such, for instance, as acetic acid, methanol, ethanol, t-butyl alcohol.

The aqueous medium containing the reaction ingredients is usually maintained under an atmosphere of olefin (where the olefin is gaseous) at superatmospheric pressure during the reaction period and, more particularly, under an olefin partial pressure of from about 50 p.s.i. to about 10000 p.s.i. In any case, the reaction is suitably carried out at about 100 to 2000 p.s.i.g. total pressure.

The temperature of the reaction may vary, for example, between ambient temperature (about 20°–30° C.), preferably at least about 40° C., and about 100° C.

The reaction may be carried out continuously, semi-continuously or by batch operation. Depending upon the particular reactants employed, the temperature of reaction and other influencing factors, the time of reaction may vary, for example, from 10 minutes, preferably from 1 hour, to 72 hours or more.

The molar proportions of the substitution ion and the per compound may be varied considerably. Usually, however, the source of the substitution ion, e.g., an alkali-metal chloride such as NaCl, constitutes from about 1 to about 10 moles thereof per mole of per compound. The mole ratio of olefin to per compound in solution is dependent upon the solubility of the olefin in the solution. With respect to ethylene, the ratio of ethylene to persulfate is quite low. (It may even be less than 1.) However, as the dissolved ethylene is consumed in the reaction, additional ethylene from the atmosphere over the aqueous solution dissolves thereby maintaining a supply of this reactant in the solution without having a large amount dissolved at any one time.

When the reaction is carried out in an aqueous reaction medium as is the preferred technique, the alpha,omega-disubstituted alkanes that are formed separate as a distinct liquid phase since they are insoluble in and heavier than the aqueous phase. The individual species of these products can be separated from each other, if desired, by fractional distillation.

The compounds resulting from the method of this invention are particularly useful in chemical synthesis because they permit simultaneous reactions at both ends of the carbon chain. By using various chemical techniques, there can be produced a series of glycols, diacids, diamines, etc., which are useful per se and also as reactants in other chemical reactions.

In order that those skilled in the art may better understand how the present invention can be carried into effect, the following examples are given by way of illustration and not by way of limitation.

The general procedure was as follows: The ingredients were charged into a 100 ml. cylindrical glass vessel having a small hole in the top to allow filling and, if desired, the removal of samples. The vessels were placed in a high-pressure rocker bomb. The air in the system was displaced with ethylene under pressure. The mixture was then heated for 72 hours under either 500 (Example 2) or 1000 (Examples 1 and 3) lbs. p.s.i.g. ethylene pressure. The dihalides that were formed during the reaction were extracted into the n-butyl ether phase. They were analyzed and identified by gas-phase chromatography.

*Example I*

In this example the following charge was heated under 1000 lbs. p.s.i.g. ethylene pressure for 72 hours. The term "mm." in this example and others means millimoles.

9.4 mm. $K_2S_2O_8$
73.5 mm. NaCl
4.3 mm. $NaNO_3$
50.0 ml. $H_2O$

Products/mm. $K_2S_2O_8$:
| | |
|---|---|
| 1,2-dichloroethane | 0.271 |
| 1,4-dichlorobutane | 0.299 |
| 1,6-dichlorohexane | 0.134 |
| 1,8-dichloroöctane | 0.062 |
| 1,10-dichlorodecane | 0.025 |
| 1,12-dichlorododecane | 0.008 |
| 1,14-dichlorotetradecane | 0.005 |

The yield to dichlorides was about 80.4 mole percent per mole of $K_2S_2O_8$ employed.

*Example II*

In this example the following charge was heated under 500 lbs. p.s.i.g. ethylene pressure for 72 hours:

7.6 mm. $K_2S_2O_8$
7.4 mm. $NaNO_3$
73.5 mm. NaCl
50.0 ml. $H_2O$

Products/mm. $K_2S_2O_8$:
| | |
|---|---|
| 1,2-dichloroethane | 0.070 |
| 1,4-dichlorobutane | 0.414 |
| 1,6-dichlorohexane | 0.169 |
| 1,8-dichloroöctane | 0.070 |
| 1,10-dichlorodecane | 0.050 |
| 1,12-dichlorododecane | 0.008 |
| 1,14-dichlorotetradecane | 0.004 |

The yield to dichlorides was about 78.5 mole percent per mole of $K_2S_2O_8$ employed.

*Example III*

This example differs from Example 1 in that $NaNO_3$ (4.3 mm.) was omitted from the formulation. In other words, the charge that was heated under 1000 p.s.i.g. ethylene pressure for 72 hours was as follows:

9.4 mm. $K_2S_2O_8$
73.5 mm. NaCl
50.0 ml. $H_2O$

Products/mm. $K_2S_2O_8$:
| | |
|---|---|
| 1,2-dichloroethane | 0.542 |
| 1,4-dichlorobutane | 0.213 |
| 1,6-dichlorohexane | 0.105 |
| 1,8-dichloroöctane | 0.039 |
| 1,10-dichlorodecane | 0.017 |
| 1,12-dichlorododecane | 0.010 |
| 1,14-dichlorotetradecane | 0.004 |

The yield to dichlorides was about 93.0 mole percent per mole of $K_2S_2O_8$ employed.

It will be understood, of course, by those skilled in the art that the present invention is not limited to the specific ingredients, proportions thereof, time and temperature of reaction and other operating conditions given in the foregoing detailed description and examples by way of illustration. For instance, instead of sodium chloride, one can use other alkali-metal salts; or, if the alpha,omega-dibromoalkanes are desired, sodium bromide or any of the other alkali-metal bromides; or any of the other sources of chlorine and bromine ions derived from, for example, chlorides or bromides, especially the water-soluble metal chlorides and bromides. Also, instead of potassium persulfate, one can use sodium or other alkali-metal or other persulfate, or other symmetrical inorganic per compounds and especially those which are at least partly soluble in water.

Having described our invention, what we desire to secure by Letters Patent of the United States is:

1. The method of producing an alpha,omega-disubstituted alkane selected from the group consisting of alpha,omega-dichloroalkanes, alpha,omega-dibromoalkanes and alpha-omega-dicyanoalkanes which comprises reacting together at a pressure ranging from about 50 p.s.i. to about 10,000 p.s.i. (1) ethylene, (2) a source of ions selected from the group consisting of chlorine, bromine and cyanide, the ions derived from alkali metal halides, dihalides of calcium, magnesium and barium, and trihalides of aluminum, antimony and cerium, and (3) an inorganic symmetrical peroxygen compound selected from the group consisting of inorganic persulfates, inorganic perphosphates and inorganic percarbonates.

2. The method of producing an alpha,omega-dihalogenoalkane selected from the group consisting of alpha,omega-dichloroalkanes and alpha,omega-dibromoalkanes which comprises reacting together in a liquid phase at a pressure ranging from about 50 p.s.i. to about 10,000 p.s.i. (1) ethylene, (2) a halide represented by the general formula $M-X$ where M represents a alkali metal and X represents a halogen selected from the group consisting of chlorine and bromine, and (3) an inorganic persulfate.

3. The method of producing an alpha,omega-dichloroalkane which comprises reacting together at a pressure ranging from about 50 p.s.i.g. to about 10,000 p.s.i. in an aqueous medium (1) ethylene, (2) a water-soluble alkali metal chloride, and (3) a water-soluble inorganic persulfate.

4. A method as in claim 3 wherein the alkali-metal chloride is sodium chloride.

5. A method as in claim 3 wherein the inorganic persulfate is an alkali-metal persulfate.

6. A method as in claim 5 wherein the alkali-metal persulfate is potassium persulfate.

7. The method of producing an alpha,omega-dichloroalkane including 1,4-dichlorobutane, which comprises reacting together ethylene, sodium chloride and potassium persulfate in an aqueous medium under an ethylene atmosphere at a pressure ranging from about 50 p.s.i. to about 10,000 p.s.i.

References Cited by the Examiner

UNITED STATES PATENTS

| | | | |
|---|---|---|---|
| 2,440,801 | 5/1948 | Hanford et al. | 260—658 |
| 2,698,348 | 12/1954 | Giraitis | 260—659 |
| 2,768,196 | 10/1956 | Huemer et al. | 260—465.8 X |
| 2,820,068 | 1/1958 | Cunningham | 260—659 |
| 2,868,837 | 1/1959 | Burland et al. | 260—465.8 X |
| 3,142,708 | 7/1964 | Young | 260—659 X |
| 3,194,847 | 7/1965 | Capp et al. | 260—659 X |

LEON ZITVER, *Primary Examiner.*

K. V. ROCKEY, *Assistant Examiner.*